Figure 1:
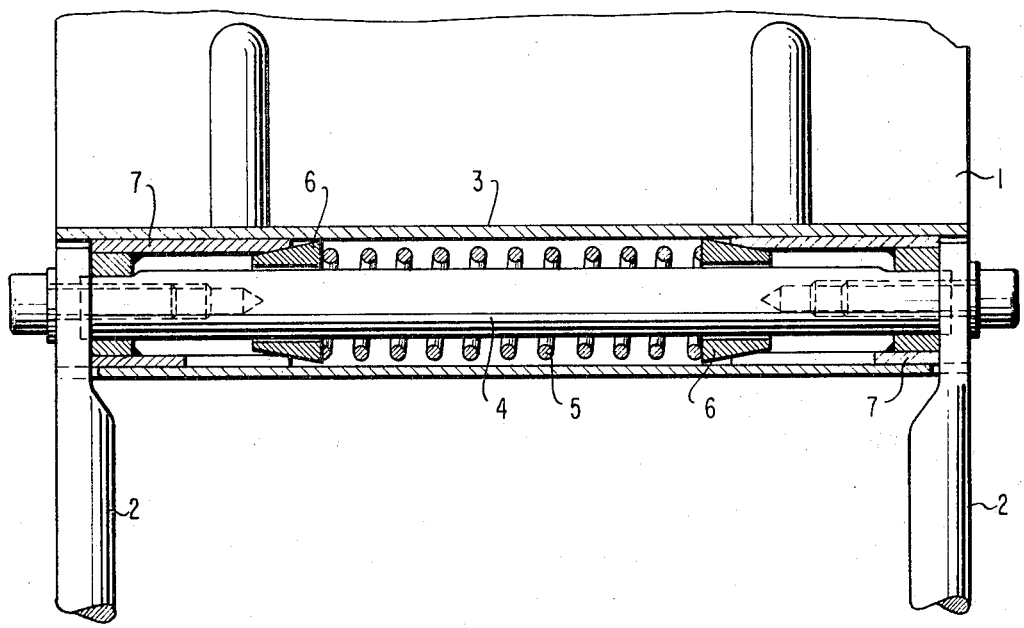

United States Patent
Flach

[15] 3,695,700
[45] Oct. 3, 1972

[54] HEADREST, ESPECIALLY FOR SEATS IN MOTOR VEHICLES

[72] Inventor: Rolf Flach, Gärtringen Wurtemberg, Germany

[73] Assignee: Daimler-Benz Aktiengesellschaft, Stuttgart-Unterturkheim, Germany

[22] Filed: April 13, 1970

[21] Appl. No.: 27,747

[30] Foreign Application Priority Data

April 12, 1969 Germany..........P 19 18 680.2

[52] U.S. Cl..................................297/408, 248/414
[51] Int. Cl.................................................A47c 1/10
[58] Field of Search......297/408, 403, 397, 355, 375; 248/412, 414

[56] References Cited

UNITED STATES PATENTS

| | | | |
|---|---|---|---|
| 1,444,024 | 2/1923 | Burdick | 297/375 X |
| 2,839,125 | 6/1958 | Brandon | 297/408 X |
| 3,004,743 | 10/1961 | Wenger | 248/414 UX |

Primary Examiner—James C. Mitchell
Attorney—Craig, Antonelli & Hill

[57] ABSTRACT

A headrest, especially for the seats in motor vehicles, in which the headrest is adjustable in its inclination against a constantly acting friction force; the adjustment is preferably stepless.

19 Claims, 2 Drawing Figures

PATENTED OCT 3 1972

3,695,700

INVENTOR
ROLF FLACH

BY Craig, Antonelli,
Stewart & Hill
ATTORNEYS

HEADREST, ESPECIALLY FOR SEATS IN MOTOR VEHICLES

The present invention relates to a headrest, especially for seats in motor vehicles.

Known headrests for seats in motor vehicles are generally adjustable in their inclination after loosening a securing screw or bolt in order to enable an adaptation to the body size and preferred seat position of the respective user.

The present invention is based on the aim to so construct a headrest that it can be adjusted in its inclination at any time without a prior loosening of any threaded connection.

As solution to the underlying problems a headrest, especially for seats in motor vehicles, is therefore proposed whereby according to the present invention the headrest is adjustable in its inclination against a continuously effective friction force.

The adjustment of the headrest takes thereby place preferably steplessly. It is particularly advantageous if the friction force is produced by a spring.

In one preferred type of construction of the present invention at least one conical pressure member which is under the constant pressure of a spring and is secured on a shaft non-rotatably connected with the supports of the headrest, is arranged on the inside of a tubular member connected securely with the headrest, which conical pressure member acts on a perfectly slotted expanding sleeve.

Advantages are also offered by a type of construction according to the present invention in which at least one expanding body made from elastic material such as rubber, synthetic resinous material or the like, which is under the constant pressure of a spring and is displaceable on a shaft non-rotatably connected with the supports of the headrest, is arranged on the inside of a tubular member rigidly connected with the headrest.

Accordingly, it is an object of the present invention to provide a headrest, especially for seats in motor vehicles, which avoids by simple means the aforementioned shortcomings and drawbacks.

Another object of the present invention resides in a headrest, especially for seats in motor vehicles which is adjustable in a stepless manner against a continuously effective friction force.

A still further object of the present invention resides in a headrest of the type described above which is simple in construction and easy to adjust.

Figure 2:
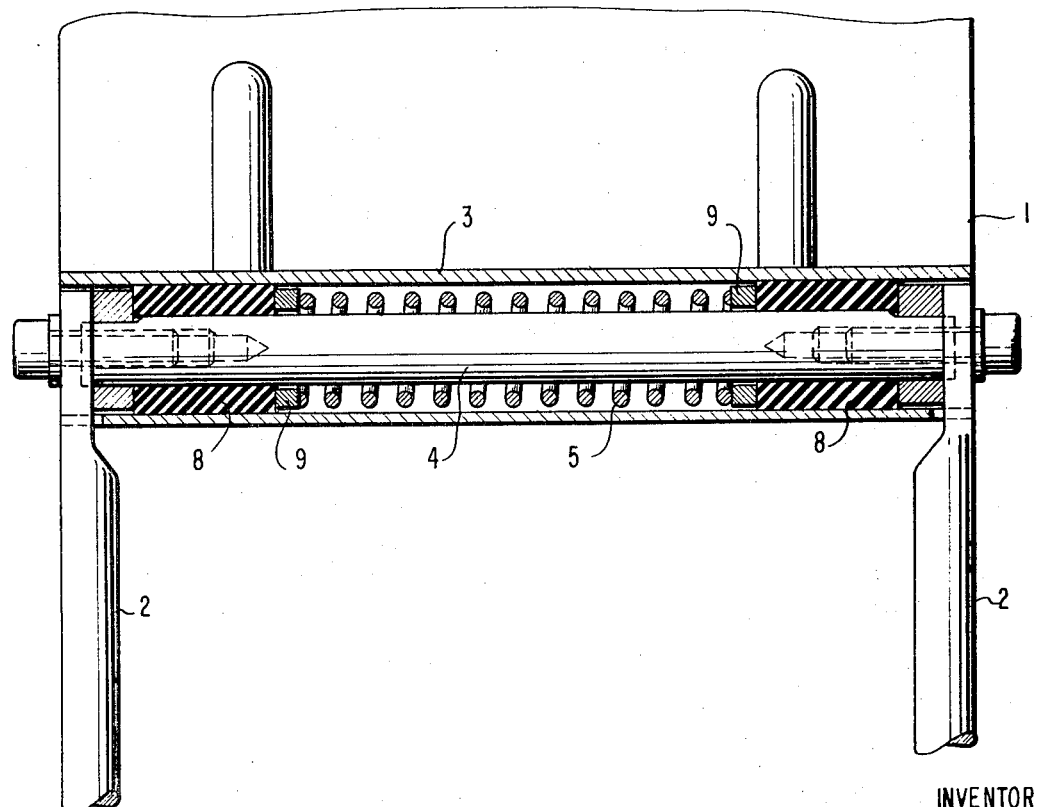

These and further objects, features and advantages of the present invention will become more obvious from the following description when taken in connection with the accompanying drawing which shows, for purposes of illustration only, two embodiments according to the present invention, and wherein:

FIG. 1 is a cross-sectional view of a first embodiment of a headrest in accordance with the present invention, and FIG. 2 is a cross-sectional view, similar to FIG. 1 of a modified embodiment of a headrest in accordance with the present invention.

Referring now to the drawing wherein like reference numerals are used throughout the two views to designate like parts, and more particularly to the FIG. 1, the headrest 1 illustrated in this embodiment is connected by way of conventional supports 2 with the vehicle seat (not shown). A compression spring 5 arranged on a shaft 4 non-rotatably connected with the supports 2 is provided on the inside of a tubular member 3 rigidly connected with the headrest 1; the compression spring 5 acts by way of conical pressure members 6 displaceably mounted on shaft 4, on slotted expanding sleeves 7 which are stationary or fixed with respect to the tubular member 3.

In the embodiment according to FIG. 2 a compression spring 5 is also arranged on the inside of a tubular member 3 connected with the headrest 1 on a shaft 4 connected with the supports 2; the spring 5 acts on two expanding bodies 8 made from suitable elastic material. In order to achieve a uniform transmission of the force of the compression spring 5 to the expanding bodies 8, a pressure disc 9 is arranged between each expanding body 8 and the spring 5.

In both embodiments shown, the headrest 1 is adjusted by rotating, manually or otherwise, the outer tubular member 3 and attached headrest 1 about the shaft 4. The friction force caused by the expanding sleeve 7 or the expanding bodies 8 engaging the shaft 4 and tubular member 3 serves to preclude inadvertent movements of the headrest and to thereby maintain the headrest in the adjusted position during normal use.

While I have shown and described only two embodiments in accordance with the present invention, it is understood that the same is not limited thereto but is susceptible of numerous changes and modifications as known to those skilled in the art. For example, instead of a single spring 5, two springs may be provided on the inside of the tubular member 3, one spring for a respective expanding member. Furthermore, the expanding effect of the expanding members 6 or 8 may also be achieved in any other manner. Hence, I do not wish to be limited to the details shown and described herein but intend to cover all such changes and modifications are encompassed by the scope of the appended claims.

I claim:

1. The combination of a headrest and an angularly adjustable attachment means for attaching the headrest to a car seat or the like, wherein said attachment means comprises support rod means connectable to the car seat for supporting the headrest in a spaced position with respect to said car seat and constantly effective friction force means adapted to resist changes in the angular orientation of said headrest.

2. The combination according to claim 1, characterized in that said attachment means is adapted to be steplessly or continuously adjustable.

3. The combination according to claim 2, characterized in that the friction force means includes a spring.

4. The combination according to claim 2, characterized in that said attachment means further comprises, shaft means non-rotatably connected to the support rod means, said headrest being rigidly connected to a tubular member disposed about said shaft means, and spring means positioned so as to force at least one conical pressure member into contact with an expanding body means positioned within the tubular member and about the shaft means.

5. The combination according to claim 4, characterized in that the expanding body means is a slotted sleeve.

6. The combination according to claim 2, characterized in that at least one conical pressure member is arranged on the inside of a tubular member securely connected with the headrest, said conical pressure member acting on an expanding body means non-rotatably connected with the support rod means.

7. The combination according to claim 6, characterized in that said expanding body means is a slotted expanding sleeve.

8. The combination according to claim 2, characterized in that at least one expanding body means made from elastic material which is subjected to a constant spring force and is mounted on a shaft non-rotatably connected with the support rod means, is arranged on the inside of a tubular member securely connected with the headrest.

9. The combination according to claim 8, characterized in that said expanding body means is under the constant force of a spring, and pressure discs arranged between said spring and the expanding body means.

10. The combination according to claim 1, characterized in that the friction force means include a spring.

11. The combination according to claim 1, characterized in that said attachment means further comprises, shaft means non-rotatably connected to the support rod means, said headrest being rigidly connected to a tubular member disposed about said shaft means, at least one conical pressure member mounted on said shaft means, and constant spring force means positioned to force said conical pressure member against an expanding body member mounted on said shaft means.

12. The combination according to claim 11, characterized in that the expanding body means is a slotted sleeve.

13. The combination according to claim 1, characterized in that at least one conical pressure member is arranged on the inside of a tubular member securely connected with the headrest, said conical pressure member acting on an expanding body means non-rotatably connected with the support rod means.

14. The combination according to claim 13, characterized in that said expanding body means is a slotted expanding sleeve.

15. The combination according to claim 17, characterized in that at least one expanding body means made from elastic material is mounted on a shaft non-rotatably connected with the support rod means, said expanding body means being arranged on the inside of a tubular member securely connected with the headrest and spring means adapted to exert a constant spring force on said expanding body means.

16. The combination according to claim 15, characterized in that said expanding body means is under the constant force of a spring, and pressure discs are arranged between said spring and the expanding body means.

17. The combination of a headrest and an angularly adjustable attachment means for attaching the headrest to a car seat or the like, wherein said attachment means comprises a tubular member rigidly attached to the headrest, support rod means connectable to the car seat for supporting the headrest in a spaced position with respect to said car seat, and means provided internally of said tubular member to exert a constant frictional force on the internal walls of said tubular member.

18. The combination according to claim 11, characterized in that two oppositely facing conical pressure members are provided adjacent respective opposite ends of the shaft means for engagement respectively with two separate expanding body members mounted on said shaft means.

19. The combination according to claim 18, characterized in that said constant spring force means consists of a single coil spring surrounding said shaft means, the opposite ends of said spring being in engagement with the two respective conical pressure members.

* * * * *